United States Patent [19]

Yamamoto

[11] Patent Number: 4,994,500

[45] Date of Patent: Feb. 19, 1991

[54] ACTIVE AND ELASTIC FOAMED MATERIALS

[76] Inventor: Keiichi Yamamoto, 13-11, Nakagawa, Ikuno-Ku 5-Chome, Osaka, Japan

[21] Appl. No.: 409,097

[22] Filed: Sep. 19, 1989

[51] Int. Cl.$^5$ ................................................ C08J 9/00
[52] U.S. Cl. ..................................... 521/92; 521/84.1; 521/91; 521/134; 521/140; 521/143; 521/150; 521/123
[58] Field of Search ................... 521/84.1, 91, 92, 134, 521/123, 140, 143, 150

[56] References Cited

U.S. PATENT DOCUMENTS 4,826,883  5/1989  Knobel et al. ..................... 521/123

Primary Examiner—Morton Foelak
Attorney, Agent, or Firm—Wenderoth, Lind & Ponack

[57] ABSTRACT

Active and elastic foamed materials useful for heating elements and medical materials comprising a foamed matrix of natural rubber, synthetic rubber or synthetic resin and an active substance contained therein, the active substance being zircon or zirconium complex compound and the content of said substance being 20-150 wt % to the foamed matrix.

1 Claim, No Drawings

ACTIVE AND ELASTIC FOAMED MATERIALS

BACKGROUND OF THE INVENTION

1. Field of the Invention:

This invention relates to active and elastic foamed materials comprising a foamed matrix and active substances contained therein and more particularly to provide novel foamed materials having unique properties as compared with conventional ones.

2. Prior Art:

Conventionally, these kind of materials have been applied to wet suits used on or in the sea. Under cold weather, it is required to provide such wet suits with heating elements. For such purposes, wet suits have been usually provided with heating wires embedded therein or constructed so as to retain any other suitable heating elements. On the other hand, when applied to medical or sanitary materials, elastic foamed materials have been included radioactive substances and used for paddings of bedclothes or blankets to serve medical treatment or used for cleaning potable water by virtue of the properties of the substances. However, there was the possibility of causing injury to human body depending upon the amount or the kind of radiation.

SUMMARY OF THE INVENTION

It is therefore an object of the present invention to provide novel foamed materials useful for heating elements or medical and sanitary materials without including radioactive substances.

In order to attain the above object, the present invention has developed novel elastic foamed materials including novel substances which radiate invisible electromagnetic radiation, whereby a body temperature can be increased without using heating wires or any other heating elements and also medical functions can be performed without using radioactive substances.

More precisely, my consecutive researches have revealed that the vibration of atoms and ions in a human body is stimulated by giving the vibration of waves equivalent to waves radiating from a human body, whereby a body temperature as well as physical strength are increased. Accordingly, particular substances radiating such waves are contained in the elastic foamed materials in accordance with the present invention. Main components of the foamed materials are natural rubbers, synthetic rubbers or synthetic resins which form a foamed matrix of the foamed materials. The active substances to be contained in the foamed matrix which radiate the waves are zircon and/or zirconium complex compounds. The amount of said substances are 20–150 wt% to the foamed matrix.

Namely, in accordance with the present invention, there is provided a novel active elastic foamed material comprising a foamed matrix of natural rubber, synthetic rubber or synthetic resin and an active substance contained therein comprising zircon or zirconium complex compounds of 20–150 wt% to the foamed matrix.

Said elastic foamed materials thus obtained may be cut into any desired shapes so as to apply to clothes or to use as medical pads for diseased parts or to form wet suits. When applied to wet suits, said elastic foamed materials are cut into pieces of desired shapes and coated on both sides with fabrics or synthetic resin sheets, whereafter wet suits are formed. Such wet suits increase a body temperature as well as physical strength, whereby long time working on or in the sea under cold weather is made possible. Furthermore, when used as medical pads for diseases parts, the circulation of the blood are promoted and the stiffness of the shoulders, for example, can be cured.

DESCRIPTION OF THE PREFERRED EMBODIMENT

The following examples are given for the purpose of illustrating the present invention.

In the tables, Zirconium complex compounds are such as potassium hexafluorozirconate ($K_4ZrF_6$), potassium octafluorozirconate ($K_4ZrF_8$) and so forth, Zircon is zirconium silicate ($ZrSiO_4$). Foaming agent (OBSH) is P,P'-oxybis(benzene sulfonyl hydrazide). The vulcanization accelerator DM is dibenzothiazyldisulfide. The hardness was determined by using a spring type hardness tester C in coformity to JIS K 6301(Japanese Industrial Standard).

| EMBODIMENT I | |
|---|---|
| | (parts by weight) |
| Natural rubber | 100 |
| Polyisobutylene | 20 |
| Lead oxide | 5 |
| Magnesium oxide | 3 |
| Foaming agent (OBSH) | 10 |
| Zirconium complex compound | 20 |
| Carbon black | 25 |
| Process oil | 30 |
| Sulfur | 3 |
| Vulcanizing accelerator DM | 2 |
| Silicon oxide | 12 |
| Condition of vulcanization | |
| Primary | 130° C. × 10 minutes |
| Secondary | 160° C. × 10 minutes |
| Apparent specific gravity | 0.16 |
| Hardness | 7 |

| EMBODIMENT II | |
|---|---|
| | (parts by weight) |
| Chloroprene rubber | 100 |
| Polyisobutylene | 20 |
| Lead oxide | 5 |
| Magnesium oxide | 3 |
| Foaming agent (OBSH) | 10 |
| Zirconium complex compound | 70 |
| Carbon black | 20 |
| Process oil | 40 |
| Zircon | 2 |
| Condition of cross-linking | |
| Primary | 132° C. × 10 minutes |
| Secondary | 160° C. ×0 10 minutes |
| Apparent specific gravity | 0.35 |
| Hardenss | 12 |

| EMBODIMENT III | |
|---|---|
| | (parts by weight) |
| Chlorosulfonated polyethylene | 100 |
| Polyisobutylene | 20 |
| Lead oxide | 5 |
| Magnesium oxide | 3 |
| Foaming agent (OBSH) | 10 |
| Zircon | 100 |
| Carbon black | 20 |
| Process oil | 55 |
| Zirconium complex compound | 7 |
| Condition of cross-linking | |
| Primary | 120° C. × 8 minutes |
| Secondary | 150° C. × 8 minutes |

-continued
EMBODIMENT III
| | (parts by weight) |
|---|---|
| Apparent specific gravity | 0.50 |
| Hardness | 20 |

EMBODIMENT IV
| | (parts by weight) |
|---|---|
| PVC (Polyvinylchloride resin) | 100 |
| Polyisobutylene | 20 |
| Stabilization agent | 3 |
| Foaming agent (OBSH) | 10 |
| Zirconium complex compound | 40 |
| Plasticizer (DOP) | 25 |
| Silicon oxide | 12 |
| Condition of foaming | |
| Primary | 160° C. × 5 minutes |
| Cooling | 100° C. × 5 minutes |
| Apparent specific gravity | 0.30 |
| Hardness | 10 |

EMBODIMENT V
| | (parts by weight) |
|---|---|
| Chloroprene rubber | 100 |
| Polyisobutylene | 20 |
| Lead oxide | 5 |
| Magnesium oxide | 3 |
| Foaming agent (OBSH) | 10 |
| Zircon | 50 |
| Carbon black | 20 |
| Process oil | 30 |
| Zirconium complex compound | 20 |
| Condition of cross-linking | |
| Primary | 100° C. × 10 minutes |
| Secondary | 160° C. × 10 minutes |
| Apparent specific gravity | 0.35 |

-continued
EMBODIMENT V
| | (parts by weight) |
|---|---|
| Hardenss | 12 |

EMBODIMENT VI
| | (parts by weight) |
|---|---|
| NBR (Acrylonitrile butadiene rubber) | 100 |
| Liquid nitrile rubber | 30 |
| Lead oxide | 5 |
| Stearic acid | 3 |
| Zircon | 150 |
| Plasticizer (DOP) | 70 |
| Silicon oxide | 20 |
| Sulfur | 20 |
| Vulcanizing accelerator DM | 3 |
| Condition of vulcanization | |
| Primary | 130° C. × 10 minutes |
| Secondary | 160° C. × 10 minutes |
| Apparent specific gravity | 0.38 |
| Hardness | 20 |

Active and elastic foamed materials thus obtained in accordance with the present invention can be cut into piesces of any desired shapes. Active substances contained therein radiate invisible electromagnetic radiation which synchronizes the energy waves radiated from a human body and increase a body temperature or physical strength or physical energy, so that long time working in the sea under cold weather can be made possible. Said materials can be also successfully used as medical pads for diseased parts. The materials being of foamed type of light weight, they are suitable for wet suits.

I claim:

1. Active and elastic foamed materials comprising a foamed matrix of natural rubber, synthetic rubber or synthetic resin and an active substance contained therein comprising zircon or zirconium complex compound of 20-150 wt% to the foamed matrix.

* * * * *

UNITED STATES PATENT AND TRADEMARK OFFICE
CERTIFICATE OF CORRECTION

PATENT NO. : 4,994,500
DATED : February 19, 1991
INVENTOR(S) : Keiichi YAMAMOTO It is certified that error appears in the above-identified patent and that said Letters Patent is hereby corrected as shown below:

Title page, Item [76], change the inventor's address to read as follows:

-- 13-11, Nakagawa 5-Chome, Ikuno-Ku, Osaka, Japan --.

Signed and Sealed this

Third Day of November, 1992

Attest:

DOUGLAS B. COMER

*Attesting Officer*     *Acting Commissioner of Patents and Trademarks*